US012787049B2

(12) United States Patent
Hsieh et al.

(10) Patent No.: US 12,787,049 B2
(45) Date of Patent: Nov. 3, 2026

(54) HAPS AND TERRESTRIAL NETWORK INTERFERENCE COORDINATION

(71) Applicant: Nokia Solutions and Networks Oy, Espoo (FI)

(72) Inventors: Tzu-Chung Hsieh, Naperville, IL (US); Fanny Jardel, Massy (FR)

(73) Assignee: Nokia Solutions and Networks Oy, Espoo (FI)

( * ) Notice: Subject to any disclaimer, the term of this patent is extended or adjusted under 35 U.S.C. 154(b) by 339 days.

(21) Appl. No.: 18/558,497

(22) PCT Filed: May 7, 2021

(86) PCT No.: PCT/US2021/031262
§ 371 (c)(1),
(2) Date: Nov. 1, 2023

(87) PCT Pub. No.: WO2022/235271
PCT Pub. Date: Nov. 10, 2022

(65) Prior Publication Data
US 2024/0224317 A1 Jul. 4, 2024

(51) Int. Cl.
*H04W 72/541* (2023.01)
*H04B 7/185* (2006.01)
*H04W 72/04* (2023.01)

(52) U.S. Cl.
CPC ...... *H04W 72/541* (2023.01); *H04B 7/18504* (2013.01); *H04W 72/04* (2013.01)

(58) Field of Classification Search
CPC .............. H04W 72/541; H04W 52/267; H04B 1/0475; H04B 7/18504
See application file for complete search history.

(56) References Cited

U.S. PATENT DOCUMENTS

2006/0229104 A1 10/2006 de La Chapelle et al.
2007/0077884 A1 4/2007 Regulinski et al.
(Continued)

FOREIGN PATENT DOCUMENTS

EP 3557780 A1 10/2019
WO 2016/057907 A1 4/2016
WO 2018/175870 A1 9/2018

OTHER PUBLICATIONS

Extended European Search Report received for corresponding European Patent Application No. 21939952.4, dated Jan. 7, 2025, 13 pages.
(Continued)

*Primary Examiner* — Khalid W Shaheed
(74) *Attorney, Agent, or Firm* — Lippes Mathias LLP

(57) ABSTRACT

In accordance with example embodiments of the invention there is at least a method which can be performed by an apparatus to estimate, a coverage area of a high altitude platform station of a communication network, wherein the estimating is based at least on an antenna gain pattern and transmit power associated with the high altitude platform station; determine an impacted at least one terrestrial network cell of the communication network impacted based on the estimated coverage area and on terrestrial network base station locations in the communication network; and coordinate with the impacted at least one terrestrial network cell at least one resource allocation to minimize interference caused by the estimated coverage area.

14 Claims, 8 Drawing Sheets

(56) References Cited

U.S. PATENT DOCUMENTS

| | | | | |
|---|---|---|---|---|
| 2011/0053628 | A1* | 3/2011 | Kim | H04B 7/18539 455/509 |
| 2016/0278064 | A1* | 9/2016 | Marsh | H04B 7/18539 |
| 2017/0272131 | A1* | 9/2017 | Ananth | H04B 7/0413 |
| 2017/0325221 | A1* | 11/2017 | Jalali | H04W 72/0446 |
| 2020/0322787 | A1* | 10/2020 | Sivavakeesar | H04W 24/02 |
| 2021/0075501 | A1* | 3/2021 | Xu | H04B 7/1853 |

OTHER PUBLICATIONS

Mei et al., "UAV-Sensing-Assisted Cellular Interference Coordination: A Cognitive Radio Approach", arXiv, Jan. 5, 2020, pp. 1-6.
"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.2.0, Jul. 2020, pp. 1-489.
"3rd Generation Partnership Project; Technical Specification Group Radio Access Network; NG-RAN; Xn application protocol (XnAP) (Release 16)", 3GPP TS 38.423, V16.2.0, Jul. 2020, pp. 1-447.
"Loon—X, the moonshot factory", x. company, Retrieved on Nov. 29, 2023, Webpage available at : https://x.company/projects/loon/.
"High Altitude Platform Station "HAPS"", SoftBank, Retrieved on Nov. 29, 2023, Webpage available at : https://www.softbank.jp/en/corp/philosophy/technology/special/ntn-solution/haps/?orig=en.
"Zephyr", Airbus Defence and Space, Retrieved on Nov. 29, 2023, Webpage available at : https://www.airbus.com/en/products-services/defence/uas/uas-solutions/zephyr.
"What's up with Stratobus?", Thales Group, Retrieved on Nov. 29, 2023, Webpage available at : https://www.thalesgroup.com/en/worldwide/space/news/whats-stratobus.
"3rd Generation Partnership Project; Technical Specification Group Radio Access Network; Study on New Radio (NR) to support non-terrestrial networks (Release 15)", 3GPP TR 38.811, V15.1.0, Jun. 2019, pp. 1-126.
"3rd Generation Partnership Project; Technical Specification Group Radio Access Network; Solutions for NR to support non-terrestrial networks (NTN) (Release 16)", 3GPP TR 38.821, V16.0.0, Dec. 2019, pp. 1-40.
"Solutions for NR to support non-terrestrial networks (NTN)", 3GPP TSG RAN meeting #86, RP-193234, Agenda: 9.1.2, Thales, Dec. 9-13, 2019, 10 pages.
International Search Report and Written Opinion received for corresponding Patent Cooperation Treaty Application No. PCT/US2021/031262, dated Aug. 12, 2021, 11 pages.

* cited by examiner

HAPS AND TERRESTRIAL NETWORK INTERFERENCE COORDINATION

TECHNICAL FIELD

The teachings in accordance with the exemplary embodiments of this invention relate generally to addressing the problem of co-channel interference in a HAPS scenario and, more specifically, relate to addressing the problem of co-channel interference between a moving HAPS and fixed terrestrial base stations in a HAPS scenario.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:

eNB eNodeB
FDD Frequency Division Duplex
gNB gNodeB
GNSS Global Navigation Satellite System
HAPS High Altitude Platform Station
MCS Modulation and Coding Scheme
NR New Radio
O&M Operation and Maintenance
RSRP Reference Signal Received Power
TN Terrestrial Network
Tx Transmit
UE User Equipment
UL Uplink
X2 The interface between eNodeBs
Xn The interface between gNodeBs A high altitude platform station (High Altitude Platform Station, HAPS) such as an unmanned drone or unmanned arial vehicle (UAV) is a communications device (for example, a base station or user equipment) that is carried by a flight carrier (for example, a balloon, an airship, or a drone as non-limiting examples). Usually, a HAPS device hovers or travels in a stratosphere above the ground. HAPS devices including unmanned Aerial Vehicle (UAVs) or drones can provide network coverage for an area on the ground. In addition, these HAPS or drones can maneuver to places that people, helicopters, and planes cannot access, providing unique imaging and logistical data communication opportunities.

However, it can be seen for example at least from FIG. 1 that a coverage area of a HAPS or drone can overlap a coverage area of the ground base station. Therefore, the HAPS or drone can interfere with the ground base station and vice versa.

Example embodiments of the invention work to address at least these issues.

SUMMARY

This section contains examples of possible implementations and is not meant to be limiting.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: estimate, a coverage area of a high altitude platform station of a communication network, wherein the estimating is based at least on an antenna gain pattern and transmit power associated with the high altitude platform station; determine an impacted at least one terrestrial network cell of the communication network impacted based on the estimated coverage area and on terrestrial network base station locations in the communication network; then, based on the determining, coordinate with the impacted at least one terrestrial network cell at least one resource allocation to minimize interference caused by the estimated coverage area.

In another example aspect of the invention, there is a method comprising: estimating, a coverage area of a high altitude platform station of a communication network, wherein the estimating is based at least on an antenna gain pattern and transmit power associated with the high altitude platform station; determining an impacted at least one terrestrial network cell of the communication network impacted based on the estimated coverage area and on terrestrial network base station locations in the communication network; then, based on the determining, coordinating with the impacted at least one terrestrial network cell at least one resource allocation to minimize interference caused by the estimated coverage area.

A further example embodiment is an apparatus or a method comprising the apparatus and the method of the previous paragraph, wherein the estimating is based on movement of the high altitude platform station, wherein the movement is causing a changing coverage area of the high altitude platform station, wherein the changing coverage area is causing at least co-channel interference for user equipment of at least one terrestrial network cell of the impacted at least one terrestrial network cell, and wherein the determining the impacted at least one terrestrial network cell is using information from an operation and maintenance function entity of the at least one terrestrial network comprising a list of terrestrial network base stations in the estimated coverage area and locations of each of the terrestrial network base stations associated with the impacted at least one terrestrial network cell, wherein the coordinating with the impacted at least one terrestrial network cell to minimize the co-channel interference for user equipment comprises: identifying user equipment in each terrestrial network cell of the impacted at least one terrestrial network cell impacted by co-channel interference in a downlink; and identifying user equipment in each terrestrial network cell of the impacted at least one terrestrial network cell generating co-channel interference in an uplink, wherein there is setting in a memory of the high altitude platform station a location of the high altitude platform station in the communication network; and determining the movement of the high altitude platform station in relation to the set location, wherein determining the changing coverage area of the high altitude platform station within the communication network being greater than a threshold, wherein the coordinating is over an established signaling link with each of the impacted at least one terrestrial network cell using at least one of an X2 or Xn interface, wherein the identifying user equipment in each terrestrial network cell of the impacted at least one terrestrial network cell impacted by co-channel interference in a downlink comprises: communicating a discovery request message with each terrestrial network cell of the impacted at least one terrestrial network cell, wherein based on the discovery request message, there is checking at least one measurement report from each of the user equipment of the impacted at least one terrestrial network cell, comprising: identifying at least one reference signal power (RSRP_serv) associated with at least one measurement report for a serving cell from each of the user equipment of the impacted at least one terrestrial network cell, identifying at least one reference signal power (RSRP_haps) associated with at least one measurement report from at least one neighbor cell of the user equipment, wherein the high altitude platform station is associated with the at least one neighbor cell, and based on RSRP_serv−RSRP_haps<threshold, then the user equipment is identified as user equipment impacted by co-channel interference in a downlink, wherein identifying user equipment in each of the impacted at least one terrestrial network cell generating high co-channel interference in an uplink comprises: communicating toward each of the terrestrial network cells impacted by the overlapping coverage area an indication of at least one interference sounding block, wherein different power levels are associated with each of the at least one interference sounding block, wherein for each of the at least one interference sounding block the impacted at least one terrestrial network cell selects one user equipment of that cell for transmitting at a particular power level on that interference sounding block, and wherein based on reception of a received power level on an interference sounding block being above a predetermined tolerance level the user equipment is identified as generating interference in an uplink associated with the coverage are, wherein based on identifying particular user equipment in the impacted at least one terrestrial network cell having a transmit power higher than a transmit power of the user equipment identified as generating interference in the uplink, the particular user equipment is also identified as generating interference in an uplink associated with the coverage area, wherein there is receiving from each cell of the impacted at least one terrestrial network cell an indication of downlink data demand for all user equipment in the cell identified as impacted by interference in the downlink and uplink data demand for all user equipment in the cell identified as generating interference in the uplink, wherein the indication causes partitioning of uplink and downlink resources to minimize interference based on the estimated coverage area caused by the co-channel interference in the downlink and the generated interference in the uplink, wherein there is partitioning at least one downlink resource grid of frequency and time into two parts scaled to the data demand, comprising a first part for normal scheduling and a second part for low power transmission; and communicating towards the impacted at least one terrestrial network cell an indication of the two parts, wherein the second part for low power transmission is for use by the user equipment identified as impacted by co-channel interference in the downlink to minimize the mutual interference associated with the radio station in the cell, and wherein there is partitioning at least one uplink resource grid of frequency and time into two parts scaled to the data demand; and communicating towards the impacted at least one terrestrial network cell an indication of the at least one uplink resource grid partitioning; and assigning to each impacted at least one terrestrial network cell a non-overlapping high power resource region scaled to the data demand of user equipment of each impacted at least one terrestrial network cell, wherein the non-overlapping high power resource region is used for scheduling transmission in a evenly distributed manner of frequency and time by the user equipment generating interference in an uplink for each impacted at least one terrestrial network cell A non-transitory computer-readable medium storing program code, the program code executed by at least one processor to perform at least the method as described in the paragraphs above.

In another example aspect of the invention, there is an apparatus comprising: means for estimating (TRANS 5D, MEM 5B, PROG 5C, and DP 5A as in FIG. 10), a coverage area of a high altitude platform station (HAPS as in FIG. 10) of a communication network (Network 1 as in FIG. 10), wherein the estimating is based at least on an antenna gain pattern and transmit power associated with the high altitude platform station; means for determining (TRANS 5D, MEM 5B, PROG 5C, and DP 5A as in FIG. 10) an impacted at least one terrestrial network cell (e.g., associated with NN12 and/or NN 13 as ion FIG. 10) of the communication network impacted based on the estimated coverage area and on terrestrial network base station locations in the communication network; and means, based on the determining, forcoordinating (TRANS 5D, MEM 5B, PROG 5C, and DP 5A as in FIG. 10) with the impacted at least one terrestrial network cell at least one resource allocation to minimize interference caused by the estimated coverage area.

In accordance with the example embodiments as described in the paragraph above, at least the means for estimating, determining, and coordinating comprises a network interface (TRANS 5D as in FIG. 10), and computer program code (PROG 5C as in FIG. 10) stored on a computer-readable medium (PROG 5C as in FIG. 10) and executed by at least one processor (DP 5A as in FIG. 10).

In another example aspect of the invention, there is an apparatus, such as a user equipment side apparatus, comprising: at least one processor; and at least one memory including computer program code, where the at least one memory and the computer program code are configured, with the at least one processor, to cause the apparatus to at least: determine, by a network node associated with at least one terrestrial network cell of a communication network, a coverage area associated with a high altitude platform station of the communication network is impacting the at least one terrestrial network cell, wherein the determining is based at least on an antenna gain pattern and transmit power associated with the high altitude platform station identifying a coverage area of the at the high altitude platform station; then based on the determining, coordinate with the high altitude platform station at least one resource allocation to minimize interference at the impacted at least one terrestrial network cell caused by the coverage area of the high altitude platform station.

In another example aspect of the invention, there is a method comprising: determining, by a network node associated with at least one terrestrial network cell of a communication network, a coverage area associated with a high altitude platform station of the communication network is impacting the at least one terrestrial network cell, wherein the determining is based at least on an antenna gain pattern and transmit power associated with the high altitude platform station identifying a coverage area of the at the high altitude platform station; and based on the determining, coordinating with the high altitude platform station at least one resource allocation to minimize interference at the impacted at least one terrestrial network cell caused by the coverage area of the high altitude platform station.

A further example embodiment is an apparatus or a method comprising the apparatus and the method of the previous paragraph, wherein the network node comprises an operation and maintenance function entity, wherein the identifying is based on movement of the high altitude platform station, wherein the movement is causing a changing coverage area of the high altitude platform station, wherein the changing coverage area is causing at least co-channel interference for user equipment of the impacted at least one terrestrial network cell, and wherein the coordinating is using information from the operation and maintenance function entity comprising a list of terrestrial network base stations in the estimated coverage area and locations of each of the terrestrial network base stations associated with the impacted at least one terrestrial network cell, In accordance with the example embodiments as described in the paragraphs above, wherein the coordinating with the high altitude platform station to minimize the co-channel interference comprises: identifying user equipment in each of the impacted at least one terrestrial network cell impacted by co-channel interference in a downlink; and identifying user equipment in each the impacted at least one terrestrial network cell generating high co-channel interference in an uplink, wherein the coordinating is over an established signaling link with the high altitude platform station using at least one of an X2 or Xn interface, wherein the identifying user equipment in each terrestrial network cell impacted by co-channel interference in a downlink comprises: communicating a discovery request message with the high altitude platform station, wherein based on the discovery request message there is checking at least one measurement report from each of the user equipment of the impacted at least one terrestrial network cell, comprising: identifying at least one reference signal power (RSRP_serv) associated with at least one measurement report for a serving cell from each of the user equipment of the impacted at least one terrestrial network cell, identifying at least one reference signal power (RSRP_haps) associated with at least one measurement report from at least one neighbor cell of the user equipment, wherein the high altitude platform station is associated with the at least one neighbor cell, and based on RSRP_serv−RSRP_haps<threshold, then the user equipment is identified as user equipment impacted by co-channel interference in a downlink, wherein identifying user equipment in each terrestrial network cell of the impacted at least one terrestrial network cell generating high co-channel interference in an uplink comprises: receiving from the high altitude platform station an indication of at least one interference sounding block, wherein different power levels are associated with each of the at least one interference sounding block; wherein for each of the at least one interference sounding block the impacted at least one terrestrial network cell selects one user equipment of that cell for transmitting at a particular power level on that interference sounding block, and wherein based on reception of a received power level on an interference sounding block being above a predetermined tolerance level the user equipment is identified as generating interference in an uplink associated with the coverage area, wherein based on identifying particular user equipment in the impacted at least one terrestrial network cell having a transmit power higher than a transmit power of the user equipment identified as generating interference in the uplink, the particular user equipment is also identified as generating interference in an uplink associated with the coverage area, wherein there is at each of at least one impacted cell communicating with the high altitude platform station an indication of downlink data demand for all user equipment in the cell identified as impacted by interference in the downlink and of uplink data demand for all user equipment identified as generating interference in the uplink, wherein the indication causes partitioning of uplink and downlink resources to minimize interference based on the estimated coverage area caused by the co-channel interference in the downlink and the generated interference in the uplink, wherein there is the impacted at least one terrestrial network cell receiving from the high altitude platform station an indication to partition at least one of a downlink resource grid of frequency and time into two parts scaled to the data demand, comprising a first part for normal scheduling and a second part for low power transmission, wherein the second part for low power transmission is for use by the user equipment identified as impacted by co-channel interference in the downlink to minimize the mutual interference associated with the radio station in the cell, and wherein there is assigning to each impacted at least one terrestrial network cell a non-overlapping high power resource region scaled to the data demand of user equipment of each impacted at least one terrestrial network cell, wherein the non-overlapping high power resource region is used for scheduling transmission in a evenly distributed manner of frequency and time by the user equipment generating interference in an uplink for each impacted at least one terrestrial network cell.

A non-transitory computer-readable medium (MEM 12B and/or MEM 13B as in FIG. 10) storing program code (PROG 12C and/or PROG 13C as in FIG. 10), the program code executed by at least one processor (DP 12A and/or DP 13A as in FIG. 10) to perform the operations as at least described in the paragraphs above.

In accordance with an example embodiment of the invention as described above there is an apparatus comprising: means for determining (TRANS 12D and/or TRANS 13D, MEM 12B and/or MEM 13B, PROG 12C and/or PROG 13C, and DP 12A and/or DP 13A as in FIG. 10), by a network node (NN 12 and/or NN 13 as in FIG. 10) associated with at least one terrestrial network cell of a communication network (network 1 as in FIG. 10), a coverage area associated with a high altitude platform station of the communication network is impacting the at least one terrestrial network cell, wherein the determining is based at least on an antenna gain pattern and transmit power associated with the high altitude platform station identifying (TRANS 12D and/or TRANS 13D, MEM 12B and/or MEM 13B, PROG 12C and/or PROG 13C, and DP 12A and/or DP 13A as in FIG. 10) a coverage area of the at the high altitude platform station; and means, based on the determining, for coordinating (TRANS 12D and/or TRANS 13D, MEM 12B and/or MEM 13B, PROG 12C and/or PROG 13C, and DP 12A and/or DP 13A as in FIG. 10) with the high altitude platform station at least one resource allocation to minimize interference at the impacted at least one terrestrial network cell caused by the coverage area of the high altitude platform station.

In the example aspect of the invention according to the paragraph above, wherein at least the means for determining, and coordinating comprises a non-transitory computer readable medium [MEM 12B and/or MEM 13B as in FIG. 10] encoded with a computer program [PROG 12C and/or PROG 13C as in FIG. 10] executable by at least one processor [DP 12A and/or DP 13A as in FIG. 10].

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

In example embodiments of this invention, there is at least methods and apparatus to perform operations for addressing problems of co-channel interference between a moving HAPS and fixed terrestrial base stations in a HAPS scenario.

High altitude platform stations (HAPS) refer to radio stations deployed on an aircraft or balloon in the stratosphere (at altitude 20-50 Km) to provide a wide area coverage on earth. Technology advances in solar panel efficiency, battery efficiency, and aeronautics have made it possible for unmanned aerial vehicles (UAV) and balloons to continuously operate in the high altitude over several months at a stretch. With the large field of view, HAPS can provide a coverage area of up to 200 Km diameter. It can provide connectivity for remote areas not served by terrestrial networks, wide coverage for IoT devices, and services for public safety and transportation industries.

Figure 1:
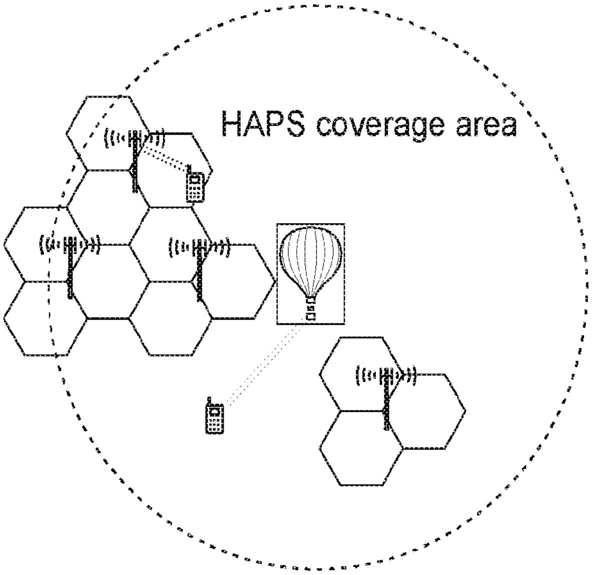
FIG. 1 shows a large HAPS coverage area overlaps with isolated terrestrial cells, causing co-channel interference between HAPS and TN.

Low frequency bands, such as existing LTE bands and NR FR1 (<6 GHz), are most suitable carrier frequency for IIAPS systems due to their low propagation loss, which translates to larger coverage and a better link budget. On the other hand, the low frequency spectrum is expensive and already fully utilized by terrestrial mobile networks. While a HAPS node is able to provide connectivity for a large area (up to 200 Km in diameter) in an underserved area, there may be isolated towns or villages served by cellular networks within the HAPS' coverage as shown in FIG. 1. Co-channel interference between HAPS and terrestrial networks (TN) thus becomes inevitable, especially for a balloon-based HAPS network like Loon where the trajectory of a HAPS node cannot be precisely controlled. The unique challenge of the HAPS-TN interference is the changing topology of interference sources due to the movement of HAPS. Conventional interference mitigation methods apply to fixed network nodes, but not a moving node like HAPS. This invention is addressing the problem of co-channel interference between a moving HAPS and fixed terrestrial base stations.

It is noted that at the time of this application, there is not an operation to apply to the HAPS operating scenario where the topology of interfering cells is changing or addressing the dynamic nature of interference between HAPS and TN.

In example embodiments of the invention, HAPS nodes are used to complement or extend the coverage of TN cells in a remote or rural area by sharing a paired FDD carriers. HAPS 5 and TN BS are able to communicate through the ground station connecting with the HAPS 5 (see FIG. 2). Both HAPS 5 and TN BS are connected to and configured by a common or inter-operable Operation and Maintenance (O&M) entities.

Figure 2:
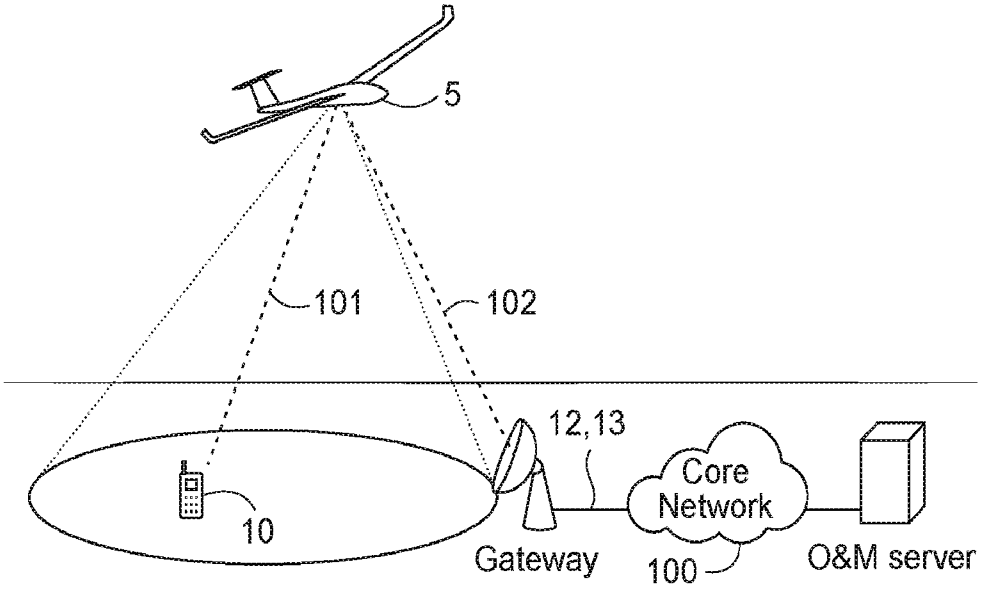
FIG. 2 shows HAPS connection to core network and O&M through a gateway station.

As shown in FIG. 2 a HAPS 5 is over a coverage area including a UE 10. As shown in FIG. 2 there is communicated between the HAPS 5 and the UE 10 a Service Link 101. Further, as shown in FIG. 2 there is communicated between the IIAPS 5 and the Gateway 12/13 a Feeder Link 102. In addition, as shown in FIG. 2 the Gateway 12/13 is connected to an O&M server via the Core Network 100. Thus, as shown in FIG. 2 HAPS 5 and the Gateway 12/13 are able to communicate with each other and a ground station e.g., including an O&M server.

Figure 10:
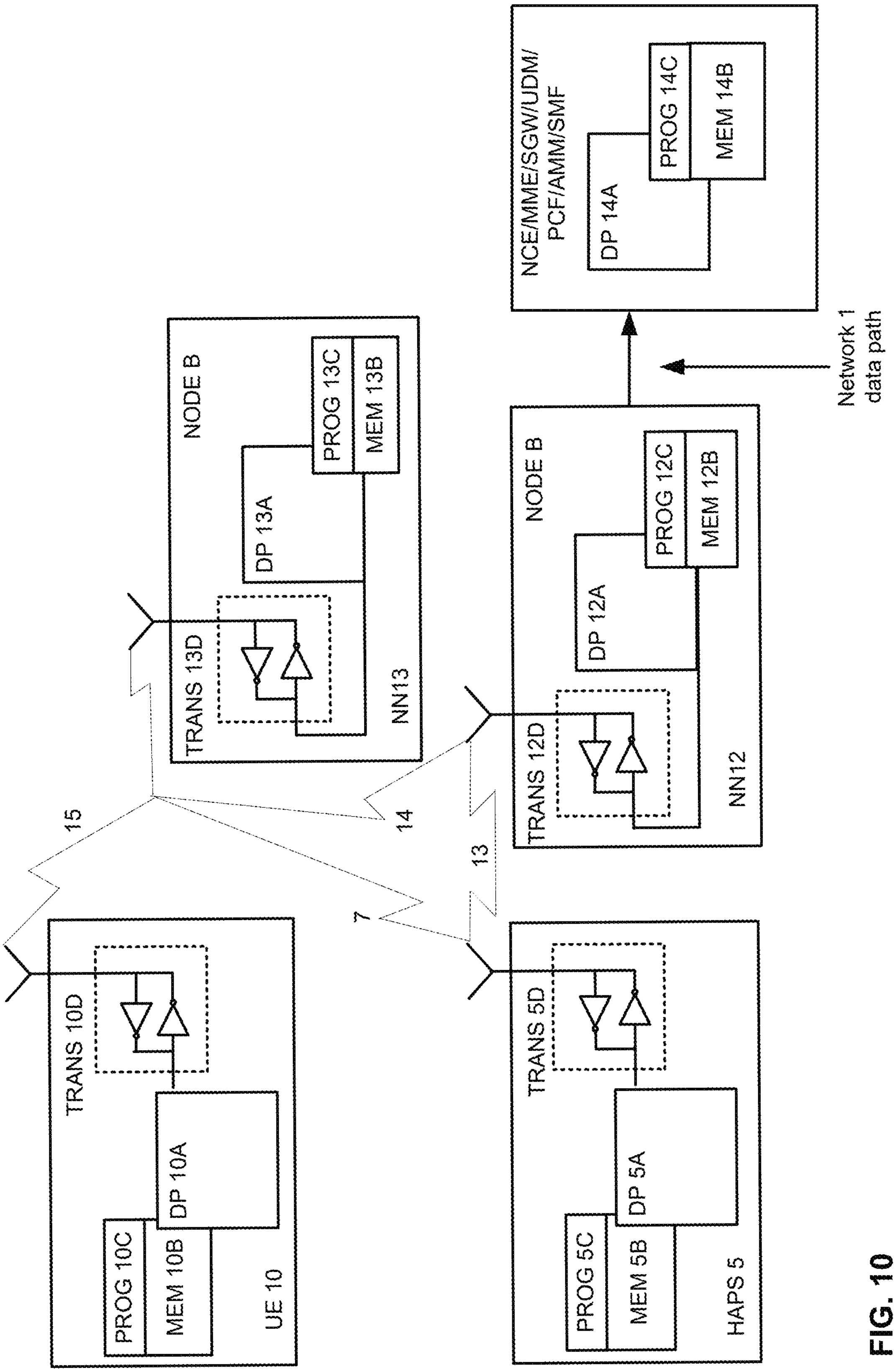
FIG. 10 shows a simplified block diagram of various electronic devices that are suitable for use in practicing the example embodiments of this invention.

Before describing the example embodiments of the invention in detail, reference is made to FIG. 10 for illustrating a simplified block diagram of various electronic devices of one possible and non-limiting exemplary system that are suitable for use in practicing the example embodiments of this invention.

FIG. 10 shows a block diagram of one possible and non-limiting exemplary system in which the example embodiments of the invention may be practiced. In FIG. 10, a user equipment (UE) 10 and a radio station (RS) 5 is in wireless communication with a wireless network 1 or network, 1 as in FIG. 10. The wireless network 1 or network 1 as in FIG. 10 can comprise a communication network such as a mobile network e.g., the mobile network 1 or first mobile network as disclosed herein. Any reference herein to a wireless network 1 as in FIG. 10 can be seen as a reference to any wireless network as disclosed herein. Further, the wireless network 1 as in FIG. 10 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The HAPS 5 (High Altitude Platform Station 5) includes one or more processors DP 5A, one or more memories MEM 5B, and one or more transceivers TRANS 5D interconnected through one or more buses. Each of the one or more transceivers TRANS 5D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 5D which can be optionally connected to one or more antennas for communication to NN 12 and NN 13, respectively. The one or more memories MEM 5B include computer program code PROG 5C. The HAPS 5 communicates with NN 12 and/or NN 13 via a wireless link 11 and/or wireless link 7. The HAPS 5 can communicate with the UE 10 via at least wireless link 7 and wireless link 15. The one or more memories MEM 5B and the computer program code PROG 5C are configured to cause, with the one or more processors DP 5A, the HAPS 5 to perform one or more of the operations as described herein.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication to NN 12 and NN 13, respectively. The one or more memories MEM 10B include computer program code PROG 10C. The UE 10 communicates with NN 12 and/or NN 13 via a wireless link 15 and/or wireless link 14. The UE 10 can communicate with the HAPS 5 via at least wireless link 15 and wireless link 7. The one or more memories MEM 10B and the computer program code PROG 10C are configured to cause, with the one or more processors DP 10A, the UE 10 to perform one or more of the operations as described herein.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 10. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D can be optionally connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via the wireless link 14. The NN 12 can communicate with the HAPS 5 via at least the wireless link 11. Further, the link 11, link 14 and/or any other link may be wired or wireless or both and may implement, e.g., an X2 or Xn interface. Further the link 11 and/or link 14 may be through other network devices such as, but not limited to an NCE/SGW/AMF/UPF device such as the NCE/MME/SGW/UDM/PCF/AMM/SMF 14 of FIG. 10. The NN 12 may perform functionalities of an MME (Mobility Management Entity) or SGW (Serving Gateway), such as a User Plane Functionality, and/or an Access Management functionality for LTE and similar functionality for 5G.

The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computerprogram code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. The Link 14 as shown in FIG. 10 can be used for communication between the NN12 and the NN13. The NN 13 can communicate with the HAPS 5 via at least the wireless link 7. These links maybe wired or wireless or both and may implement, e.g., an X2 or Xn interface. Further, as stated above the link 11 and/or link 14 may be through other network devices such as, but not limited to an NCE/MME/SGW device such as the NCE/MME/SGW/UDM/PCF/AMM/SMF 14 of FIG. 10.

The one or more buses of the device of FIG. 10 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D, TRANS 5D, and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to an RRH for example.

It is noted that although FIG. 10 shows a network nodes Such as NN 12 and NN 13. Any of these nodes may can incorporate or be incorporated into an eNodeB or eNB or gNB such as for LTE and NR, and would still be configurable to perform example embodiments of the invention.

Also, it is noted that description herein indicates that "cells" perform functions, but it should be clear that the gNB that forms the cell and/or a user equipment and/or a radio station and/or mobility management function device that will perform the functions. In addition, the cell makes up part of a gNB, and there can be multiple cells per gNB.

The wireless network 1 or any network it can represent may or may not include a NCE/MME/SGW/UDM/PCF/AMM/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (iUDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, DP5A, and/or DP14A and memories MEM 10B, MEM 12B, MEM 13B, MEM 5B, and/or MEM 14B, and also such virtualized entities create technical effects.

The computer readable memories MEM 12B, MEM 13B, MEM 5B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, MEM 5B, and MEM 14B may be means for performing storage functions. The processors DP10, DP12A, DP13A, DP5A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, DP5A, and DP14A may be means for performing functions, such as controlling the UE 10, HAPS 5, NN 12, NN 13, and other functions as described herein.

In general, the various embodiments of the HAPS 5 can include a High Altitude Platform Station or node associated with a terrestrial network or any drone type radio or a radio in aircraft or any other airborne vehicle. The various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

As similarly stated above, in accordance with example embodiments of the invention HAPS nodes are used to complement or extend the coverage of TN cells in a remote or rural area by sharing a paired FDD carriers. HAPS and TN BS are able to communicate through the ground station connecting with the HAPS (see FIG. 2). Both HAPS and TN BS are connected to and configured by a common or inter-operable Operation and Maintenance (O&M) entities.

Example embodiments of the invention includes at least these three parts:

1) IIAPS discovers the impacted TN cells overlapped with its coverage;
2) HAPS and the identified TN cells jointly discover impacted UEs in the DL and the interfering UEs in the UL; and
3) HAPS coordinates with the TN cells resource allocation to minimize the impact of HAPS-TN co-channel interference.

These processes need to be performed in sequence. Since HAPS may move to different geographic areas over time, the processes may need to be repeated once the movement of HAPS since the last update of process 1), denoted as d, is greater than a threshold $d_u$. The HAPS interference coordination processes are shown in FIG. 3 below.

Figure 3:
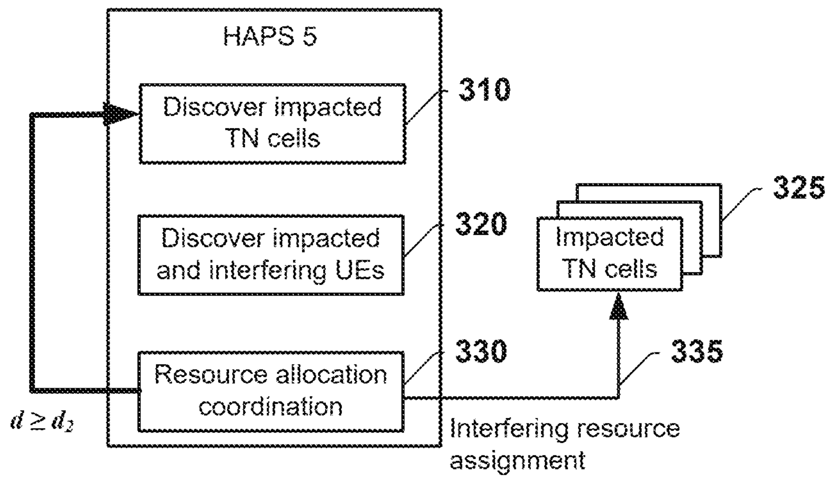
FIG. 3 shows processes of HAPS interference coordination.

A more complete set of inventive steps can include as shown in FIG. 3 operations in accordance with example embodiments of the invention with devices including a HAPS 5 as in FIG. 10.

As shown in FIG. 3 there are performed processes of HAPS interference coordination. FIG. 3 shows communication in accordance with example embodiments of the invention between HAPS 5, TN Cell 1 12, and TN Cell 2 13. As shown in step 410 of FIG. 3 there is communicated between HAPS 5, the TN Cell 1 12, and the TN Cell 2 13 an impacted discovery request message. In step 420 of FIG. 3 there is shown determining by the TN Cell 1 12 cell 1 impacted UEs. In step 425 of FIG. 3 there is shown determining by the TN Cell 2 13 cell 2 impacted UEs. As shown in step 430 of FIG. 4 there is communicated between the TN Cell 1 12 and the HAPS 5 a Cell 1 impacted UE data demand message. Then as shown in step 435 of FIG. 4 there is communicated between the TN Cell 2 13 and the HAPS 5 a Cell 22 impacted UE data demand message.

These operations include:

1. HAPS 5 discovers the impacted TN cells overlapped with its coverage:

a. HAPS 5 calculates its coverage area based on transmit power and beam patterns. (Note: HAPS transmit power and beam patterns may change according to the HAPS's battery energy level and desired coverage area.);
b. HAPS 5 obtains regional TN BS positions from core network;
c. HAPS 5 determines the TN cells within its coverage; and
d. HAPS 5 repeats steps a to c after it moves a distance $d_u$, from the location of the last update;

2. IIAPS 5 and the identified TN cells jointly discover impacted UEs in the DIL and the interfering UEs in the UL:
  a. Discovery of DL impacted UEs:
    i. HAPS 5 sends Impacted UE discovery request message to impacted TN cells over X2/Xn interface; and
    ii. Impacted TN cell determines UEs impacted by HAPS based on connected UEs' measurement report;
  b. Discovery of UL interfering UEs:
    i. HAPS 5 assigns each impacted cell a designated non-overlapping resource block for "interference sounding";
    ii. Each cell schedules UL data transmission in its interference sounding block for UEs with different transmit power levels and refrains from scheduling UEs in other cells' sounding blocks;
    iii. HAPS 5 and TN cells measure the received power of sounding blocks and determine which ones have power above the tolerance level; and
    iv. Interfering UEs are identified based on their UL transmit power and the power level of the interference sounding blocks above tolerance;
3. HAPS 5 coordinates with the TN cells resource allocation to minimize the impact of HAPS-TN co-channel interference:
  a. DL resource coordination:
    i. Each impacted TN cell informs HAPS of the DL data demand of its impacted UEs;
    ii. HAPS sets aside a resource block for impacted TN UEs and another resource block for impacted HAPS UEs. (Note: This step may not be new, but potential novelty is the partition of resource based on data demand); and
  b. UL resource coordination:
    i. Each impacted TN cell informs HAPS of the UL data demand of its interfering UEs;
    ii. HAPS assigns each impacted TN cell a unique non-overlapping resource block for its interfering UEs (in such a manner that the high interfering power is distributed evenly across the bandwidth and over time slots).

Proposed solutions in accordance with example embodiments of the invention allow interference between HAPS and TN to be minimized dynamically, even when the HAPS trajectory is unpredictable and the topology of interfering/interfered TN is changing, and ensures sufficient utilization of bandwidth based on the traffic demand of HAPS and TN.

When the terrestrial mobile network (TN) shares its spectrum with HAPS, cooperation between HAPS and TN can significantly increase the coverage in a underserved area (where terrestrial cells are spotty), while the co-channel interference can be minimized through coordination between HAPS and TN base stations. Through the ground gateway station, a HAPS node may communicate with the O&M of TN and may also establish X2/Xn link with TN eNB/gNB. This invention of HAPS-TN interference coordination is divided into three parts as below.

HAPS Discovers Impacted TN Cells

From the navigation system or onboard GNSS receiver, HAPS knows its current location. With its connection with the O&M of overlaid mobile network through the ground station, the HAPS node can discover the TN cells it needs to coordinate with for interference mitigation following these steps:

a) Calculates its geographic area of coverage based on HAPS' current antenna/beam pattern and transmit power, as well as its current location;
b) Obtains a list of TN base stations and their locations of a region encompassing its coverage area from the TN O&M function;
c) Determines the TN cells within its coverage based on the results of a) and b), and saves its location at the moment, denoted as $P_0$; and
d) Monitors its current location P. When it has moved from $P_0$ a distance d greater than a threshold $d_u$, i.e., $d=|P-P_0|>d_u$, repeats steps a) to c). UEs.

HAPS and TN Cells Discover DL Impacted and UL Interfering UEs (a) After HAPS determines the impacted TN cells, it establishes NodeB-to-NodeB signaling link (X2 in LTE, Xn in NR) with each of the TN cells through its connection with the ground gateway station. Over the X2/Xn link, HAPS cooperates with the TN cells to identify the UEs impacted by co-channel interference in the downlink and the UEs generating high co-channel interference in the uplink.

Discovery of DL Impacted UEs

HAPS first sends a "impacted UE discovery request" message to each of impacted TN cells over the X2/Xn interface. The TN cells can simply examine the measurement reports from their connected UEs and identify those UEs who have measured a strong reference signal power from the IIAPS cell relative to the TN serving cell. If the RSRP difference is $\Delta P=RSRP_{srv}-RSRP_{HAPS}$, where $RSRP_{srv}$ and $RSRP_{HAPS}$ denote the serving cell RSRP and HAPS RSRP respectively, an impacted UE can be identified by its ΔP less than a certain threshold, $\Delta P<\Delta P_{th}$. Afterwards, each impacted TN cell estimates the data demand of the impacted UEs that have been identified in the cell, and sends back this information in "Impacted UE data demand" message to the HAPS.

HAPS can perform similar task of identifying its UEs that are severely impacted by the interference from the TN and estimating the data demand of those UEs. After receiving Impacted UE data demand messages from all impacted TN cells, the HAPS are aware of the data demand of the impacted TN UEs and impacted HAPS UEs.

Figure 4:
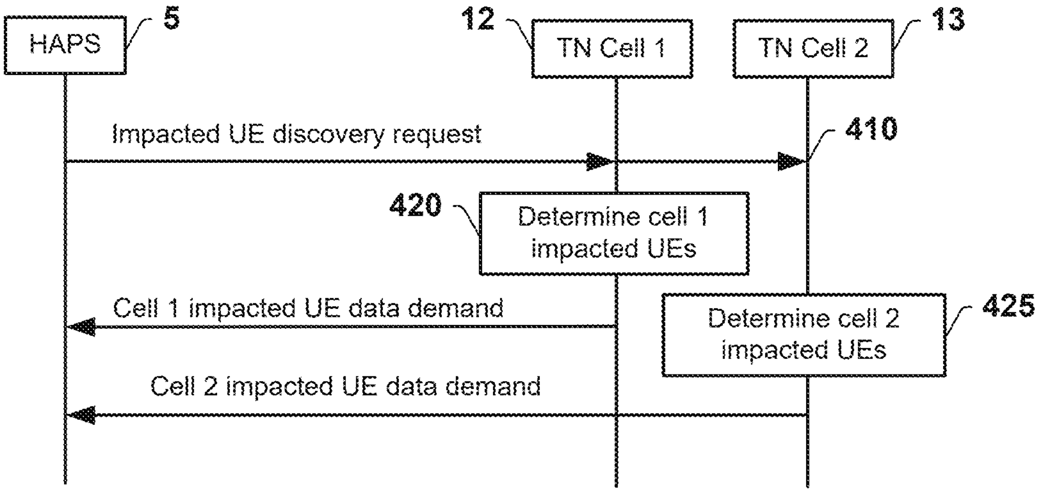
FIG. 4 shows discovery of TN UEs impacted by HAPS in DL.

FIG. 4 shows discovery of TN UEs impacted by a HAPS in DL in accordance with example embodiments of the invention. The HAPS 5 of FIG. 4 can be such as the HAPS 5 of FIG. 10. As shown in FIG. 4 there is communications between HAPS 5, TN Cell 1 12 and TN Cell 2 13. As shown in step 410 of FIG. 4 there is communicated between the HAPS 5, the TN Cell 112, and the TN Cell 2 13 an impacted discovery request 410. As shown in step 420 of FIG. 4 the TN Cell 1 12 is determining cell 1 impacted UEs. As shown in step 425 of FIG. 4 the TN Cell 2 13 is determining cell 2 impacted UEs. As shown in step 430 of FIG. 4 there is communicated between the TN Cell 1 12 and the HAPS 5 a cell impacted UE data demand message. In addition, as shown in step 435 of FIG. 4 there is communicated between the TN Cell 2 13 and the HAPS 5 a cell impacted UE data demand message.

Discovery of UL Interfering UEs

Figure 5:
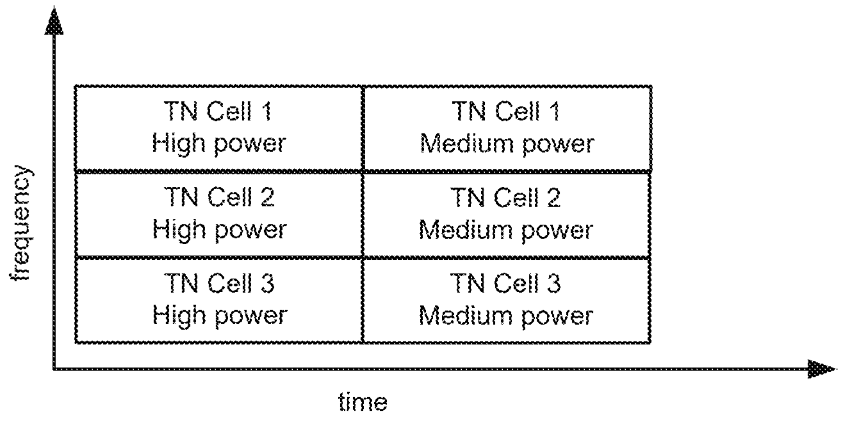
FIG. 5 shows example of interference sounding block configuration.
Figure 6:
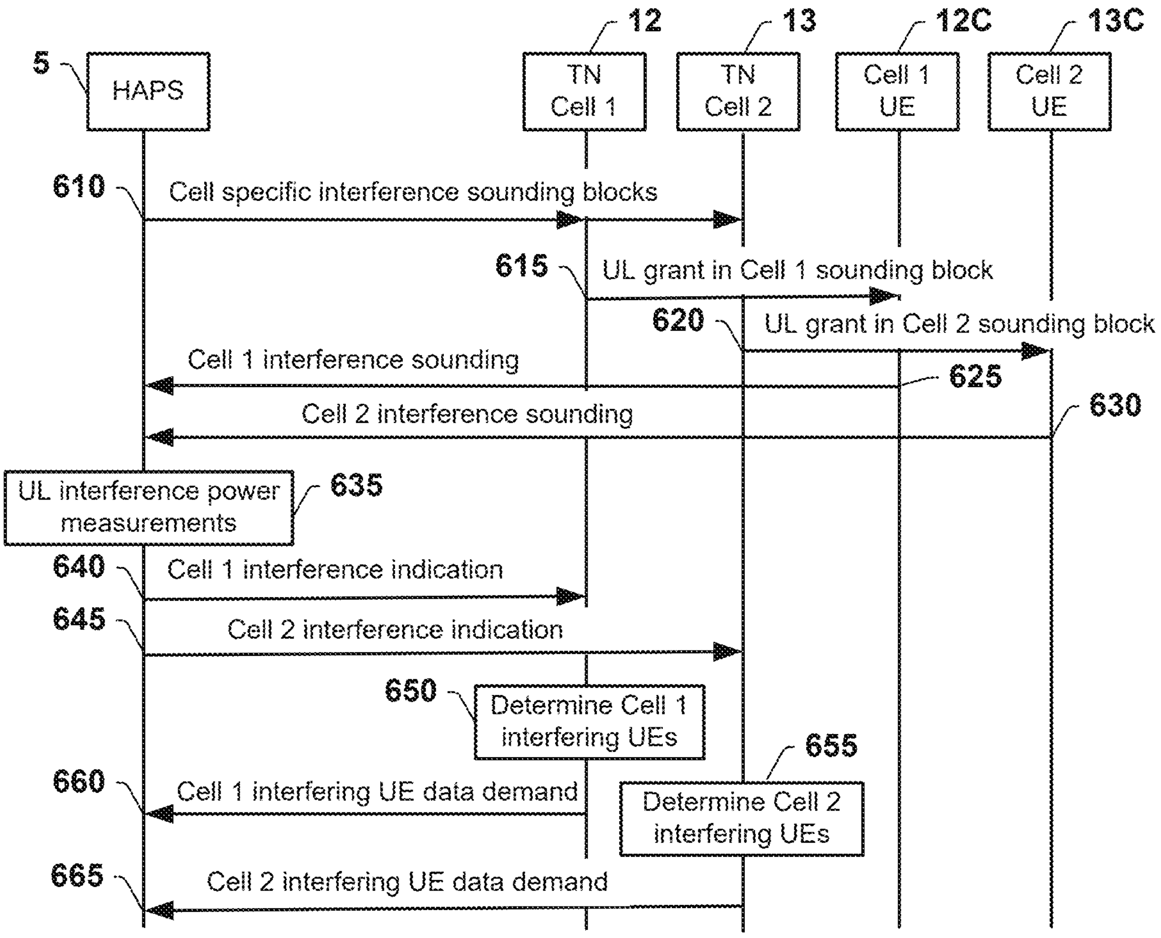
FIG. 6 shows discovery TN UEs interfering HAPS in UL.

Uplink interference caused by UEs from a different network can only be measured by the base station receiver. To discover the UEs generating high UL interference, we introduce a novel notion of "interference sounding," where UEs operating at different transmission power levels in the TN are scheduled to transmit reference signal for the HAPS to set the power level for interfering UE identification. The following steps are proposed to discover the UEs in the TN who generate high interference to HAPS:

i. HAPS assigns each impacted TN cell a designated, non-overlapping resource block for interference sounding with different power levels. An example is illustrated in FIG. 5. The assignment is carried in the "Cell specific interference sounding blocks" message over X2/Xn interface, as shown in FIG. 6;
ii. Each impacted TN cell schedules selected UEs of different transmit powers for the cell's interference sounding blocks, one UE for each block. For example, the TN cell may infer UE1 is currently transmitting at a high power and UE2 transmitting at medium power from the UL power control loop, and schedule UE1 and UE2 respectively to transmit sounding signal in sounding block 1 and sounding block 2. Furthermore, each impacted TN cell also refrains from using the sounding blocks assigned to other cells;
iii. HAPS measures the received power in each interference sounding block and determines if the received power is above a tolerance level. Sounding blocks with power above tolerance are indicated to TN cells in the "Cell x interference indication" message in FIG. 6; and
iv. With the power indication of the sounding blocks, a TN cell can infer the Tx power level to constitute a highly interfering UE based on the various Tx powers of the scheduled sounding blocks. The TN cell can then identify the highly interfering UEs by comparing the UE's Tx power in the power control loop and the inferred Tx power level. The TN cell can further estimate the data demand of those interfering UEs and report the estimate back to HAPS in the "Cell x interfering UE data demand" message in FIG. 6.

FIG. 5 shows example of interference sounding block configuration. As shown in FIG. 5 there is interference sounding in different frequencies and times with different power levels.

FIG. 6 shows discovery of TN UEs interfering HAPS in UL. The HAPS 5 of FIG. 6 can be such as the HAPS 5 of FIG. 10. As shown in FIG. 6 there is communications between HAPS 5, TN Cell 1 12, TN Cell 2 13, Cell 1 UE 12C, and Cell 2 UE 13C. As shown in step 610 of FIG. 6 there is communicated between the HAPS 5, the TN Cell 1 12, and the TN Cell 2 13 cell specific interference sounding blocks 610. As shown in step 615 of FIG. 6 there is communicated between the TN Cell 1 12 and the Cell 1 UE 12C an UL grant in cell 1 sounding block. As shown in step 620 of FIG. 6 there is communicated between the TN Cell 2 13 and the Cell 2 UE 13C an UL grant in cell 2 sounding block. As shown in step 625 of FIG. 6 there is communicated between the Cell 1 UE 12C and the HAPS 5 Cell 1 interference sounding. As shown in step 630 of FIG. 6 there is communicated between the Cell 2 UE 13C and the HAPS 5 Cell 2 interference sounding. Then as shown in step 635 of FIG. 6 the HAPS 5 is performing UL interference power measurement. As shown in step 640 of FIG. 6 there is communicated between the HAPS 5 and the TN Cell 1 12 a Cell 1 interference indication. As shown in step 645 of FIG. 6 there is communicated between the HAPS 5 and the TN Cell 2 13 a Cell 2 interference indication. As shown in step 650 of FIG. 6 there is determining by the TN Cell 1 12 cell 1 interfering UEs. As shown in step 655 of FIG. 6 there is determining by the TN Cell 2 13 cell 2 interfering UEs. As shown in step 660 of FIG. 6 there is communicated between the TN Cell 1 12 and the HAPS 5 a Cell 1 interfering UE data demand message. Then As shown in step 665 of FIG. 6 there is communicated between the TN Cell 2 13 and the HAPS 5 a Cell 2 interfering UE data demand message.

Figure 7:
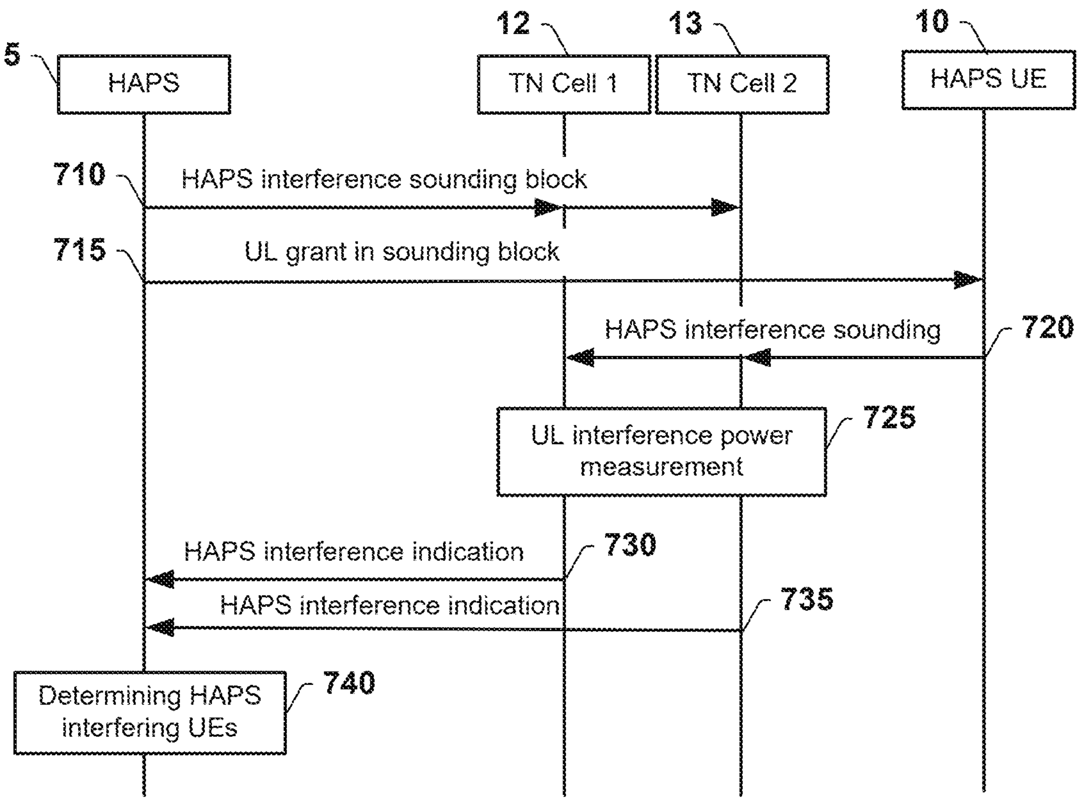
FIG. 7 shows discovery of HAPS UEs interfering with TN cells in UL.

Similar method can be used to discover the UEs served by HAPS that cause high UL interference to the TN. The procedure is illustrated in FIG. 7. First HAPS informs all impacted TN cells of the interference sounding blocks it will use, and then schedules a number of HAPS UEs with different Tx powers for those sounding blocks, one UE for each block. All impacted TN cells refrain from using those sounding blocks for UL transmission and measure the received power in them. Then feedback to the HAPS in the message "HAPS interference indication" which sounding blocks have interference power above the tolerance level. With this feedback from all impacted TN cells, the HAPS can determine what Tx power level of its UEs may cause high interference to the TN. Consequently, IIAPS can identify its interfering UEs by the UE's Tx power in the UL power control loop with the determined Tx power level and then estimate the data demand of those UEs.

FIG. 7 shows discovery of HAPS UEs interfering with TN cells in UL. As shown in FIG. 7 there is communications between HAPS 5, TN Cell 1 12, TN Cell 2 13, and HAPS UE 10. As shown in step 710 of FIG. 7 there is communicated between the HAPS 5, the TN Cell 1 12, and the TN Cell 2 13 a HAPS interference sounding block. As shown in step 715 of FIG. 7 there is communicated between the HAPS 5 and the HAPS UE 10 UL grant in sounding block. As shown in step 720 of FIG. 7 there is communicated between the HAPS UE 10, the TN Cell 112, and the TN Cell 2 13 HAPS interference sounding. As shown in step 725 of FIG. 7 the TN Cell 1 12 and the TN Cell 2 13 are performing UL Interference Power measurement. As shown in step 730 of FIG. 7 there is communicated between the TN Cell 1 12 and the HAPS 5 HAPS interference indication. As shown in step 735 of FIG. 7 there is communicated between the TN Cell 2 13 and the HAPS 5 HAPS interference indication. Then as shown in step 740 of FIG. 7 there is determining by the HAPS 5 interfering UEs.

HAPS Coordinates with TN Cells in Resource Allocation

After discovered the impacted TN cells and determined the data demands of the impacted UEs in the DL and the interfering UEs in the UL, the HAPS has sufficient information to coordinate resource allocation with the TN to reduce mutual interference while attempting to meet the data demand of all UEs.

Coordination of Resources for DL Impacted UEs

Figure 8:
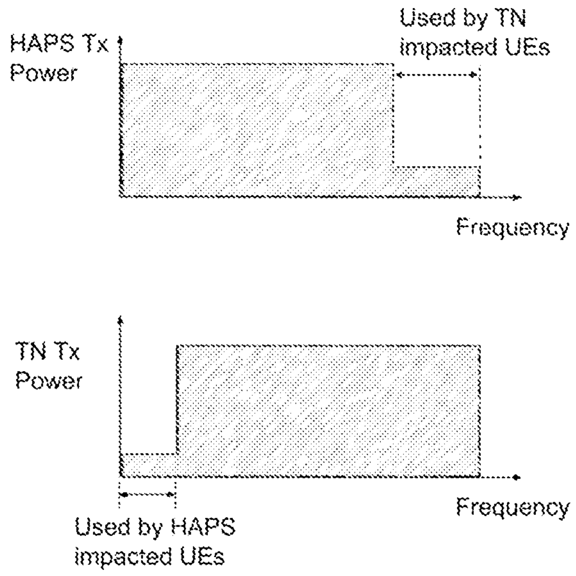
FIG. 8 shows an illustration of DL resource allocation for impacted UEs.

Considering the data demands of the impacted UEs in the TN and its own UEs, HAPS can partition its DL resource grid (in frequency and time) into two parts, one for normal scheduling and another for low power transmission. HAPS' low Tx power resource is to be shared with TN's impacted UEs. HAPS may use that resource zone to serve its own UEs in good channel condition using robust modulation and coding scheme (MCS) but with low transmission power, or even leave the resource zone blank without transmission, to create a low interference zone for the TN. HAPS then informs the impacted TN cells about the low power zone for the impacted UEs. Similarly, IIAPS can also inform TN cells about the resource block it will assign to its UEs impacted by TN interference, so that TN cell can possibly reduce Tx power for the resource block. An example of resource partition in the frequency domain for normal scheduling and low power transmission is illustrated in FIG. 8.

Coordination of Resources for UL Interfering UEs

Figure 9:
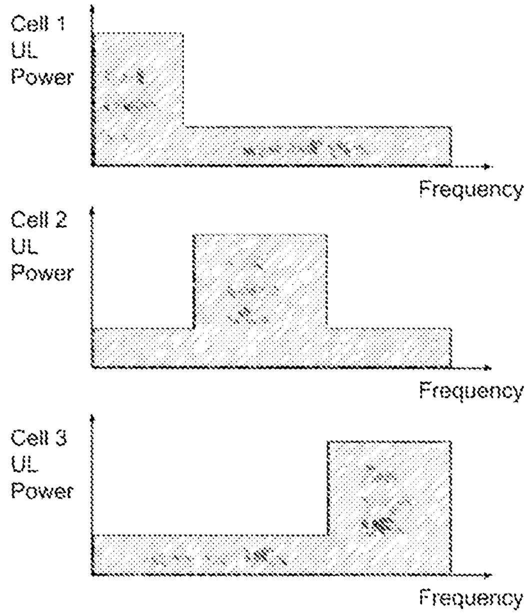
FIG. 9 shows an illustration of UL resource allocation for interfering UEs.

Considering the data demand of interfering UEs in the TN cells, HAPS attempts to coordinate the interfering UEs' UL resource in order for the interference power to be distributed evenly across the bandwidth and time slots. HAPS can assign each impacted TN cell a non-overlapping high power resource region, scaled to the data demand of the cell's interfering UEs. And the TN cell schedules its interfering UEs (typically cell edge UEs transmitting at high power) for the designated resource region informed by the HAPS. An example of non-overlapping "cell edge UE" resource regions over the bandwidth for three TN cells is illustrated in FIG. 9. Similarly, HAPS can schedule its UEs highly interfering to TN in an evenly distributed manner in the frequency-time resource grid.

Figure 11A:
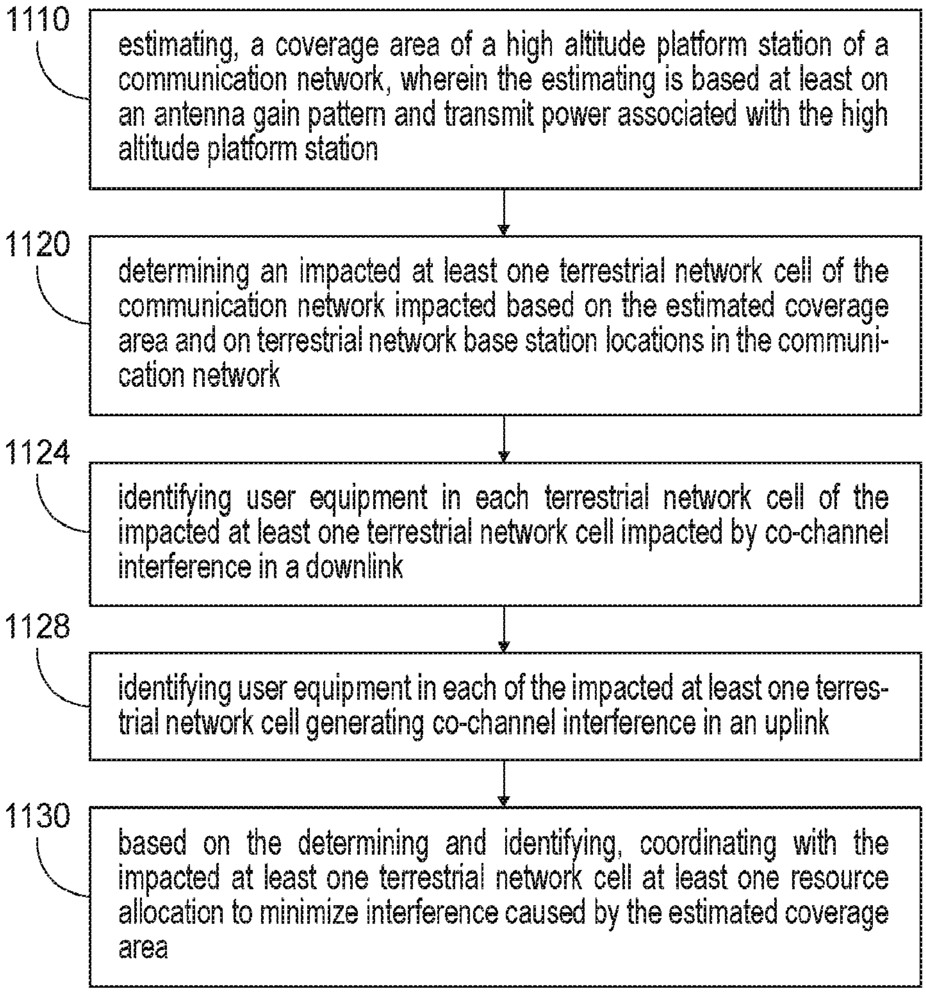
FIG. 11A and FIG. 11B each show a method which may be performed by an apparatus in accordance with example embodiments of the invention.
Figure 11B:
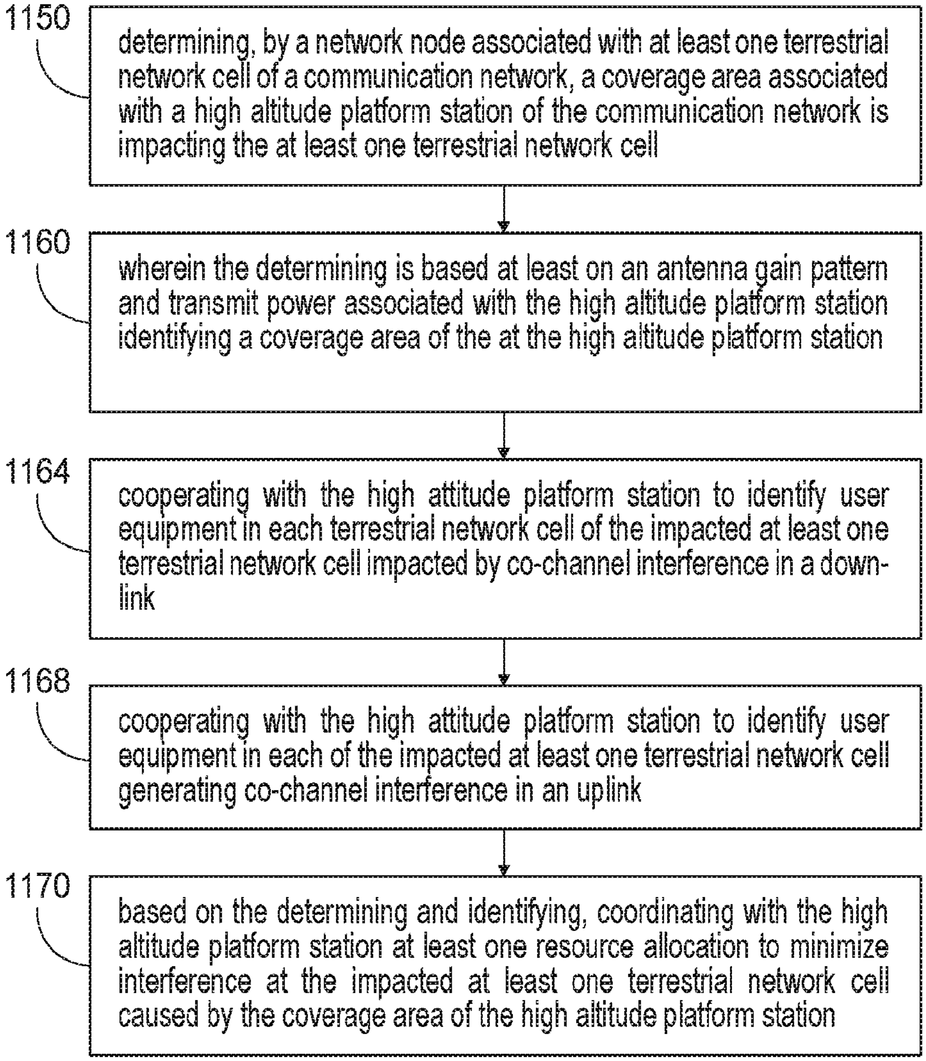

FIG. 11A and FIG. 11B each show a method which may be performed by an apparatus in accordance with example embodiments of the invention.

FIG. 11A illustrates operations which may be performed by a network device such as, but not limited to, a network device such as the HAPS 5 of FIG. 10 as in FIG. 2 or a high altitude platform station. As shown in step 1110 of FIG. 11A there is estimating, a coverage area of a high altitude platform station of a communication network, wherein the estimating is based at least on an antenna gain pattern and transmit power associated with the high altitude platform station. As shown in step 1120 of FIG. 11A there is determining an impacted at least one terrestrial network cell of the communication network impacted based on the estimated coverage area and on terrestrial network base station locations in the communication network. As shown in step 1124 of FIG. 11A there is identifying user equipment in each terrestrial network cell of the impacted at least one terrestrial network cell impacted by co-channel interference in a downlink. As shown in step 1128 of FIG. 11A there is identifying user equipment in each of the impacted at least one terrestrial network cell generating co-channel interference in an uplink. Then as shown in step 1130 of FIG. 11A there is, based on the determining and identifying, coordinating with the impacted at least one terrestrial network cell at least one resource allocation to minimize interference caused by the estimated coverage area.

In accordance with the example embodiments as described in the paragraph above, wherein the estimating is based on movement of the high altitude platform station, wherein the movement is causing a changing coverage area of the high altitude platform station, wherein the changing coverage area is causing at least co-channel interference for user equipment of at least one terrestrial network cell of the impacted at least one terrestrial network cell, and wherein the determining the impacted at least one terrestrial network cell is using information from an operation and maintenance function entity of the at least one terrestrial network comprising a list of terrestrial network base stations in the estimated coverage area and locations of each of the terrestrial network base stations associated with the impacted at least one terrestrial network cell.

In accordance with the example embodiments as described in the paragraphs above, wherein the coordinating with the high altitude platform station to minimize the co-channel interference comprises: identifying user equipment in each of the impacted at least one terrestrial network cell impacted by co-channel interference in a downlink; and identifying user equipment in each the impacted at least one terrestrial network cell generating high co-channel interference in an uplink.

In accordance with the example embodiments as described in the paragraphs above, wherein the coordinating is over an established signaling link with the high altitude platform station using at least one of an X2 or Xn interface.

In accordance with the example embodiments as described in the paragraphs above, wherein the identifying user equipment in each terrestrial network cell of the impacted at least one terrestrial network cell impacted by co-channel interference in a downlink comprises: communicating a discovery request message with each terrestrial network cell of the impacted at least one terrestrial network cell, wherein based on the discovery request message, there is checking at least one measurement report from each of the user equipment of the impacted at least one terrestrial network cell, comprising: identifying at least one reference signal power (RSRP_serv) associated with at least one measurement report for a serving cell from each of the user equipment of the impacted at least one terrestrial network cell, identifying at least one reference signal power (RSRP_haps) associated with at least one measurement report from at least one neighbor cell of the user equipment, wherein the high altitude platform station is associated with the at least one neighbor cell, and based on RSRP_serv−RSRP_haps<threshold, then the user equipment is identified as user equipment impacted by co-channel interference in a downlink.

In accordance with the example embodiments as described in the paragraphs above, wherein identifying user equipment in each of the impacted at least one terrestrial network cell generating high co-channel interference in an uplink comprises: communicating toward each of the terrestrial network cells impacted by the overlapping coverage area an indication of at least one interference sounding block, wherein different power levels are associated with each of the at least one interference sounding block, wherein for each of the at least one interference sounding block the impacted at least one terrestrial network cell selects one user equipment of that cell for transmitting at a particular power level on that interference sounding block, and wherein based on reception of a received power level on an interference sounding block being above a predetermined tolerance level the user equipment is identified as generating interference in an uplink associated with the coverage area.

In accordance with the example embodiments as described in the paragraphs above, wherein based on identifying particular user equipment in the impacted at least one terrestrial network cell having a transmit power higher than a transmit power of the user equipment identified as generating interference in the uplink, the particular user equipment is also identified as generating interference in an uplink associated with the coverage area.

In accordance with the example embodiments as described in the paragraphs above, there is receiving from each cell of the impacted at least one terrestrial network cell an indication of downlink data demand for all user equipment in the cell identified as impacted by interference in the downlink and uplink data demand for all user equipment in the cell identified as generating interference in the uplink, wherein the indication causes partitioning of uplink and downlink resources to minimize interference based on the estimated coverage area caused by the co-channel interference in the downlink and the generated interference in the uplink.

In accordance with the example embodiments as described in the paragraphs above, there is partitioning at least one downlink resource grid of frequency and time into two parts scaled to the data demand, comprising a first part for normal scheduling and a second part for low power transmission; and communicating towards the impacted at least one terrestrial network cell an indication of the two parts, wherein the second part for low power transmission is for use by the user equipment identified as impacted by co-channel interference in the downlink to minimize the mutual interference associated with the radio station in the cell.

In accordance with the example embodiments as described in the paragraphs above, there is partitioning at least one uplink resource grid of frequency and time into two parts scaled to the data demand; and communicating towards the impacted at least one terrestrial network cell an indication of the at least one uplink resource grid partitioning; and assigning to each impacted at least one terrestrial network cell a non-overlapping high power resource region scaled to the data demand of user equipment of each impacted at least one terrestrial network cell, wherein the non-overlapping high power resource region is used for scheduling transmission in a evenly distributed manner of frequency and time by the user equipment generating interference in an uplink for each impacted at least one terrestrial network cell.

A non-transitory computer-readable medium (MEM 5B as in FIG. 10) storing program code (PROG5C as in FIG. 10), the program code executed by at least one processor (DP 5A as in FIG. 10) to perform the operations as at least described in the paragraphs above.

In accordance with an example embodiment of the invention as described above there is an apparatus comprising: means for estimating (TRANS 5D, MEM 5B, PROG 5C, and DP 5A as in FIG. 10), a coverage area of a high altitude platform station (HAPS as in FIG. 10) of a communication network (Network 1 as in FIG. 10), wherein the estimating is based at least on an antenna gain pattern and transmit power associated with the high altitude platform station; means for determining (TRANS 5D, MEM 5B, PROG 5C, and DP 5A as in FIG. 10) an impacted at least one terrestrial network cell (e.g., associated with NN12 and/or NN 13 as ion FIG. 10) of the communication network impacted based on the estimated coverage area and on terrestrial network base station locations in the communication network; means for identifying (TRANS 5D, MEM 5B, PROG 5C, and DP 5A as in FIG. 10) user equipment in each terrestrial network cell of the impacted at least one terrestrial network cell impacted by co-channel interference in a downlink; means for identifying (TRANS 5D, MEM 5B, PROG 5C, and DP 5A as in FIG. 10) user equipment in each of the impacted at least one terrestrial network cell generating co-channel interference in an uplinkand means, based on the determining, for coordinating (TRANS 5D, MEM 5B, PROG 5C, and DP 5A as in FIG. 10) with the impacted at least one terrestrial network cell at least one resource allocation to minimize interference caused by the estimated coverage area.

In the example aspect of the invention according to the paragraph above, wherein at least the means for estimating, determining, and coordinating comprises a non-transitory computer readable medium [MEM 5B] encoded with a computer program [PROG 5C] executable by at least one processor [DP 5A].

FIG. 11B illustrates operations which may be performed by a network node such as, but not limited to, a network device such as the NN 12 and/or NN 13 as in FIG. 10 or a base station. As shown in step 1150 of FIG. 11B there is determining, by a network node associated with at least one terrestrial network cell of a communication network, a coverage area associated with a high altitude platform station of the communication network is impacting the at least one terrestrial network cell. As shown in step 1160 of FIG. 111B wherein the determining is based at least on an antenna gain pattern and transmit power associated with the high altitude platform station identifying a coverage area of the at the high altitude platform station. As shown in step 1164 of FIG. 1113 there is cooperating with the high attitude platform station to identify user equipment in each terrestrial network cell of the impacted at least one terrestrial network cell impacted by co-channel interference in a downlink. As shown in step 1168 of FIG. 1113 there is cooperating with the high attitude platform station to identify user equipment in each of the impacted at least one terrestrial network cell generating co-channel interference in an uplink. Then as shown in step 1170 of FIG. 111B there is, based on the determining and identifying, coordinating with the high altitude platform station at least one resource allocation to minimize interference at the impacted at least one terrestrial network cell caused by the coverage area of the high altitude platform station.

In accordance with the example embodiments as described in the paragraph above, wherein the network node comprises an operation and maintenance function entity.

In accordance with the example embodiments as described in the paragraphs above, wherein the identifying is based on movement of the high altitude platform station, wherein the movement is causing a changing coverage area of the high altitude platform station, wherein the changing coverage area is causing at least co-channel interference for user equipment of the impacted at least one terrestrial network cell, and wherein the coordinating is using information from the operation and maintenance function entity comprising a list of terrestrial network base stations in the estimated coverage area and locations of each of the terrestrial network base stations associated with the impacted at least one terrestrial network cell.

In accordance with the example embodiments as described in the paragraphs above, wherein the coordinating with the high altitude platform station to minimize the co-channel interference comprises: identifying user equipment in each terrestrial network cell of the impacted at least one terrestrial network cell impacted by co-channel interference in a downlink; and identifying user equipment in each terrestrial network cell of the impacted at least one terrestrial network cell generating high co-channel interference in an uplink.

In accordance with the example embodiments as described in the paragraphs above, wherein the coordinating is over an established signaling link with the high altitude platform station using at least one of an X2 or Xn interface.

In accordance with the example embodiments as described in the paragraphs above, wherein the identifying user equipment in each terrestrial network cell of the impacted at least one terrestrial network cell impacted by co-channel interference in a downlink comprises: communicating a discovery request message with the high altitude platform station, wherein based on the discovery request message, a reference signal power of a measurement report from each of the user equipment served by the impacted at least one terrestrial network cell is compared with a reference signal power from a cell served by the high altitude platform station as measured by each of the user equipment served by each terrestrial network cell of the impacted at least one terrestrial network cell; and based on a difference of reference signal power being less a threshold, the user equipment are identified as impacted by co-channel interference in a downlink.

In accordance with the example embodiments as described in the paragraphs above, wherein identifying user equipment in each terrestrial network cell of the impacted at least one terrestrial network cell generating high co-channel interference in an uplink comprises: communicating with the high altitude platform station an indication of at least one interference sounding block, wherein different power levels are associated with each of the at least one interference sounding block, wherein for each particular interference sounding block of the at least one interference sounding block each of the impacted at least one terrestrial network cell selects one user equipment of that cell for transmitting at a different power level of the different power levels on that particular interference sounding block, and wherein based on reception of a received power level from user equipment using an interference sounding block being above a predetermined tolerance level the user equipment is identified as generating interference in an uplink associated with the coverage area.

In accordance with the example embodiments as described in the paragraphs above, wherein the identifying is based on a transmitted power level from user equipment transmitting at a particular power level of an interference sounding block assigned to the user equipment by the impacted at least one terrestrial network cell; and based on the transmit power and the particular power level being above the predetermined tolerance level, the user equipment is identified as generating interference in an uplink associated with the coverage area.

In accordance with the example embodiments as described in the paragraphs above, there is communicating with each of the user equipment identified as impacted by co-channel interference in the downlink and identified as generating interference in the uplink associated with the coverage area an indication of an estimated data demand comprising at least one of downlink data demand or uplink data demand of user equipment at each of the impacted at least one terrestrial network cell, wherein the data demand can be based on user equipment transmit power in an uplink power control loop.

In accordance with the example embodiments as described in the paragraphs above, there is receiving an indication of partitioning of at least one downlink resource grid of frequency and time in two parts scaled to the data demand, comprising a first part for normal scheduling and a second part for low power transmission, wherein the second part for low power transmission is for use by the user equipment identified as impacted by co-channel interference in the downlink to minimize the mutual interference associated with the radio station in the cell.

In accordance with the example embodiments as described in the paragraphs above, wherein the partitioning is such that there is at least one of: partitioning a downlink resource grid for one of normal or low power transmission by the user equipment or normal or low power reception by the high altitude platform station, or partitioning an uplink resource grid for high power transmission by the user equipment.

In accordance with the example embodiments as described in the paragraphs above, there is receiving an indication of partitioning of at least one uplink resource grid of frequency and time into two parts scaled to the data demand, wherein based on the receiving, a non-overlapping high power resource region scaled to the data demand of user equipment is assigned to each impacted at least one terrestrial network cell, and wherein the non-overlapping high power resource region is used for scheduling transmission in a evenly distributed manner of frequency and time by the user equipment generating interference in an uplink.

A non-transitory computer-readable medium (MEM 12B and/or MEM 13B as in FIG. 10) storing program code (PROG 12C and/or PROG 13C as in FIG. 10), the program code executed by at least one processor (DP 12A and/or DP 13A as in FIG. 10) to perform the operations as at least described in the paragraphs above.

In accordance with an example embodiment of the invention as described above there is an apparatus comprising: means for determining (TRANS 12D and/or TRANS 13D, MEM 12B and/or MEM 13B, PROG 12C and/or PROG 13C, and DP 12A and/or DP 13A as in FIG. 10), by a network node (NN 12 and/or NN 13 as in FIG. 10) associated with at least one terrestrial network cell of a communication network (network 1 as in FIG. 10), a coverage area associated with a high altitude platform station of the communication network is impacting the at least one terrestrial network cell, wherein the determining is based at least on an antenna gain pattern and transmit power associated with the high altitude platform station identifying (TRANS 12D and/or TRANS 13D, MEM 12B and/or MEM 13B, PROG 12C and/or PROG 13C, and DP 12A and/or DP 13A as in FIG. 10) a coverage area of the at the high altitude platform station; means for cooperating (TRANS 12D and/or TRANS 13D, MEM 12B and/or MEM 13B, PROG 12C and/or PROG 13C, and DP 12A and/or DP 13A as in FIG. 10) with the high attitude platform station to identify user equipment in each terrestrial network cell of the impacted at least one terrestrial network cell impacted by co-channel interference in a downlink; means for cooperating (TRANS 12D and/or TRANS 13D, MEM 12B and/or MEM 13B, PROG 12C and/or PROG 13C, and DP 12A and/or DP 13A as in FIG. 10) with the high attitude platform station to identify user equipment in each of the impacted at least one terrestrial network cell generating co-channel interference in an uplink.and means, based on the determining, for coordinating (TRANS 12D and/or TRANS 13D, MEM 12B and/or MEM 13B, PROG 12C and/or PROG 13C, and DP 12A and/or DP 13A as in FIG. 10) with the high altitude platform station at least one resource allocation to minimize interference at the impacted at least one terrestrial network cell caused by the coverage area of the high altitude platform station.

In the example aspect of the invention according to the paragraph above, wherein at least the means for estimating, determining, and coordinating comprises a non-transitory computer readable medium [MEM 12B and/or MEM 13B as in FIG. 10] encoded with a computer program [PROG 12C and/or PROG 13C as in FIG. 10] executable by at least one processor [DP 12A and/or DP 13A as in FIG. 10].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
  (i) a combination of analog and/or digital hardware circuit(s) with software/firmware; and
  (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:

(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" as may be used herein is intended to relate to "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:

estimating, a coverage area of a high altitude platform station of a communication network, wherein the estimating is based at least on an antenna gain pattern and transmit power associated with the high altitude platform station;

determining an impacted at least one terrestrial network cell of the communication network impacted based on the estimated coverage area and on terrestrial network base station locations in the communication network; and based on the determining, coordinating with the impacted at least one terrestrial network cell at least one resource allocation to minimize interference caused by the estimated coverage area, wherein the estimating is based on movement of the high altitude platform station, wherein the movement is causing a changing coverage area of the high altitude platform station, wherein the changing coverage area is causing at least co-channel interference for user equipment of at least one terrestrial network cell of the impacted at least one terrestrial network cell, and wherein the determining the impacted at least one terrestrial network cell is using information from an operation and maintenance function entity of the at least one terrestrial network comprising a list of terrestrial network base stations in the estimated coverage area and locations of each of the terrestrial network base stations associated with the impacted at least one terrestrial network cell.

2. An apparatus, comprising:

at least one processor; and at least one non-transitory memory including computer program code, where the at least one non-transitory memory and the computer program code are configured, with the at least one processor, to cause the apparatus to at least:

estimate, a coverage area of a high altitude platform station of a communication network, wherein the estimating is based at least on an antenna gain pattern and transmit power associated with the high altitude platform station;

determine an impacted at least one terrestrial network cell of the communication network impacted based on the estimated coverage area and on terrestrial network base station locations in the communication network; and based on the determining, coordinate with the impacted at least one terrestrial network cell at least one resource allocation to minimize interference caused by the estimated coverage area, wherein the estimating is based on movement of the high altitude platform station, wherein the movement is causing a changing coverage area of the high altitude platform station, wherein the changing coverage area is causing at least co-channel interference for user equipment of at least one terrestrial network cell of the impacted at least one terrestrial network cell, and wherein the determining the impacted at least one terrestrial network cell is using information from an operation and maintenance function entity of the at least one terrestrial network comprising a list of terrestrial network base stations in the estimated coverage area and locations of each of the terrestrial network base stations associated with the impacted at least one terrestrial network cell.

3. The apparatus of claim 2, wherein the coordinating with the impacted at least one terrestrial network cell to minimize the co-channel interference for user equipment comprises:

identifying user equipment in each terrestrial network cell of the impacted at least one terrestrial network cell impacted by co-channel interference in a downlink; and identifying user equipment in each terrestrial network cell of the impacted at least one terrestrial network cell generating co-channel interference in an uplink.

4. The apparatus according to claim 2, wherein the at least one memory including the computer program code is configured with the at least one processor to cause the apparatus to:

set in a memory of the high altitude platform station a location of the high altitude platform station in the communication network; and determine the movement of the high altitude platform station in relation to the set location, wherein determining the changing coverage area of the high altitude platform station within the communication network being greater than a threshold.

5. The apparatus according to claim 2, wherein the coordinating is over an established signaling link with each of the impacted at least one terrestrial network cell using at least one of an X2 or Xn interface.

6. The apparatus of claim 3, wherein the identifying user equipment in each terrestrial network cell of the impacted at least one terrestrial network cell impacted by co-channel interference in a downlink comprises:

communicating a discovery request message with each terrestrial network cell of the impacted at least one terrestrial network cell, wherein based on the discovery request message, there is checking at least one measurement report from each of the user equipment of the impacted at least one terrestrial network cell, comprising:

identifying at least one reference signal power (RSRP_serv) associated with at least one measurement report for a serving cell from each of the user equipment of the impacted at least one terrestrial network cell, identifying at least one reference signal power (RSRP_haps) associated with at least one measurement report from at least one neighbor cell of the user equipment, wherein the high altitude platform station is associated with the at least one neighbor cell, and based on RSRP_serv-RSRP_haps<threshold, then the user equipment is identified as user equipment impacted by co-channel interference in a downlink.

7. The apparatus of claim 3, wherein the identifying user equipment in each of the impacted at least one terrestrial network cell generating high co-channel interference in an uplink comprises:

communicating toward each of the terrestrial network cells impacted by the overlapping coverage area an indication of at least one interference sounding block, wherein different power levels are associated with each of the at least one interference sounding block, wherein for each of the at least one interference sounding block the impacted at least one terrestrial network cell selects one user equipment of that cell for transmitting at a particular power level on that interference sounding block, and wherein based on reception of a received power level on an interference sounding block being above a predetermined tolerance level the user equipment is identified as generating interference in an uplink associated with the coverage area.

8. The apparatus of claim 7, wherein based on identifying particular user equipment in the impacted at least one terrestrial network cell having a transmit power higher than a transmit power of the user equipment identified as generating interference in the uplink, the particular user equipment is also identified as generating interference in an uplink associated with the coverage area.

9. The apparatus according to claim 6, wherein the at least one memory including the computer program code is configured with the at least one processor to cause the apparatus to:

communicate with each cell of the impacted at least one terrestrial network cell an indication of downlink demand for all user equipment in the cell identified as impacted by interference in a downlink and of uplink demand for all user equipment in the cell identified as generating interference in the uplink, wherein the indication causes partitioning of uplink and downlink resources to minimize interference based on the estimated coverage area caused by the co-channel interference in the downlink and the generated interference in the uplink.

10. The apparatus of claim 9, the at least one memory including the computer program code is configured with the at least one processor to cause the apparatus to:

partition at least one downlink resource grid of frequency and time into two parts scaled to the data demand, comprising a first part for normal scheduling and a second part for low power transmission; and communicate towards the impacted at least one terrestrial network cell an indication of the two parts, wherein the second part for low power transmission is for use by the user equipment identified as impacted by co-channel interference in the downlink to minimize the mutual interference associated with the radio station in the cell.

11. The apparatus of claim 9, wherein the at least one memory including the computer program code is configured with the at least one processor to cause the apparatus to:

partition at least one uplink resource grid of frequency and time into two parts scaled to the data demand; and communicate towards the impacted at least one terrestrial network cell an indication of the at least one uplink resource grid partitioning; and assigning to each impacted at least one terrestrial network cell a non-overlapping high power resource region scaled to the data demand of user equipment of each impacted at least one terrestrial network cell, wherein the non-overlapping high power resource region is used for scheduling transmission in a evenly distributed manner of frequency and time by the user equipment generating interference in an uplink for each impacted at least one terrestrial network cell.

12. An apparatus, comprising:

at least one processor; and at least one non-transitory memory including computer program code, where the at least one non-transitory memory and the computer program code are configured, with the at least one processor, to cause the apparatus to at least:

determine, a coverage area associated with a high altitude platform station of a communication network is impacting the at least one terrestrial network cell, wherein the determining is based at least on an antenna gain pattern and transmit power associated with the high altitude platform station identifying a coverage area of the at the high altitude platform station; and based on the determining, coordinating with the high altitude platform station at least one resource allocation to minimize interference at the impacted at least one terrestrial network cell caused by the coverage area of the high altitude platform station, wherein the apparatus comprises an operation and maintenance function entity, and wherein the identifying is based on movement of the high altitude platform station, wherein the movement is causing a changing coverage area of the high altitude platform station, wherein the changing coverage area is causing at least co-channel interference for user equipment of the impacted at least one terrestrial network cell, and wherein the coordinating is using information from the operation and maintenance function entity comprising a list of terrestrial network base stations in the coverage area and locations of each of the terrestrial network base stations associated with the impacted at least one terrestrial network cell.

13. The apparatus of claim 12, wherein the coordinating with the high altitude platform station to minimize the co-channel interference comprises:

identifying user equipment in each of the impacted at least one terrestrial network cell impacted by co-channel interference in a downlink; and identifying user equipment in each the impacted at least one terrestrial network cell generating high co-channel interference in an uplink.

14. The apparatus according to claim 12, wherein the coordinating is over an established signaling link with the high altitude platform station using at least one of an X2 or Xn interface.

* * * * *